March 12, 1940.   A. G. PAPRITZ   2,193,375
AIRPLANE
Filed Oct. 31, 1938   8 Sheets-Sheet 1
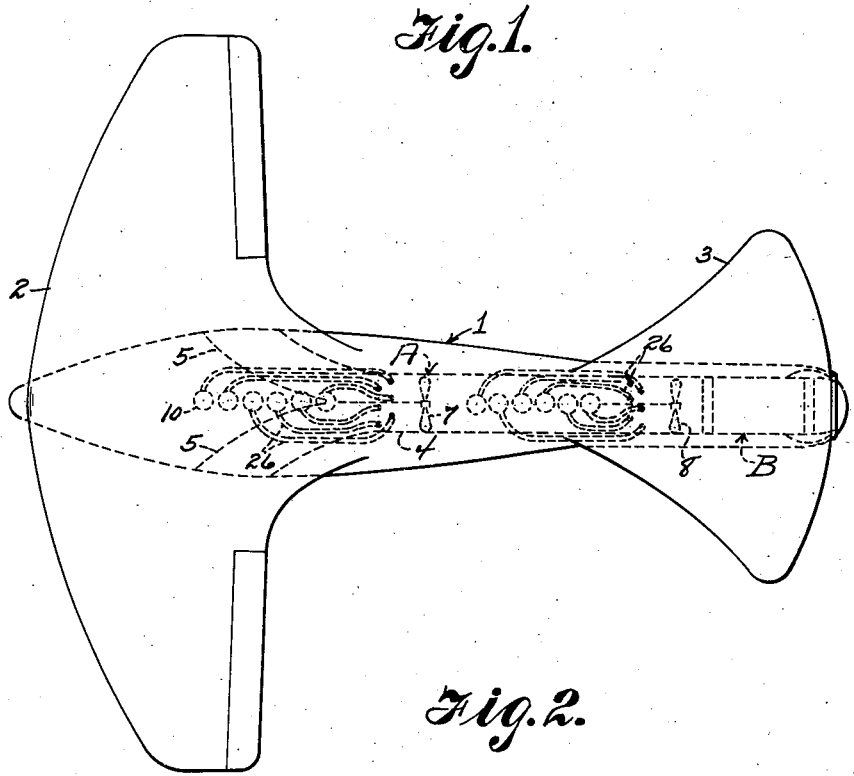
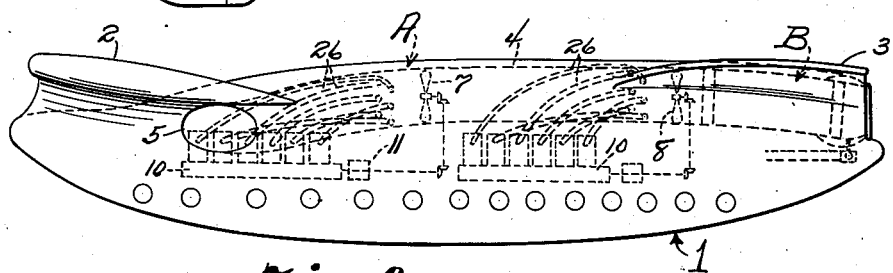
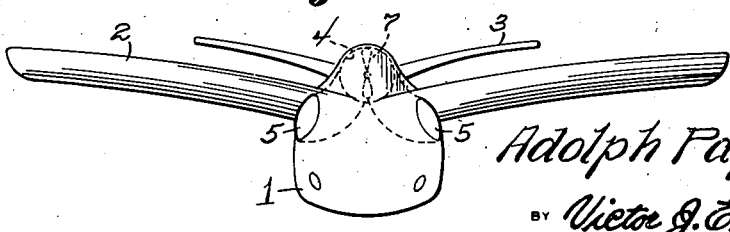
Adolph Papritz
INVENTOR
BY Victor J. Evans & Co.
ATTORNEYS March 12, 1940.　　A. G. PAPRITZ　　2,193,375
AIRPLANE
Filed Oct. 31, 1938　　8 Sheets-Sheet 2

Adolph Papritz INVENTOR
BY Victor J. Evans & Co.
ATTORNEYS

March 12, 1940. A. G. PAPRITZ 2,193,375
AIRPLANE
Filed Oct. 31, 1938 8 Sheets-Sheet 3
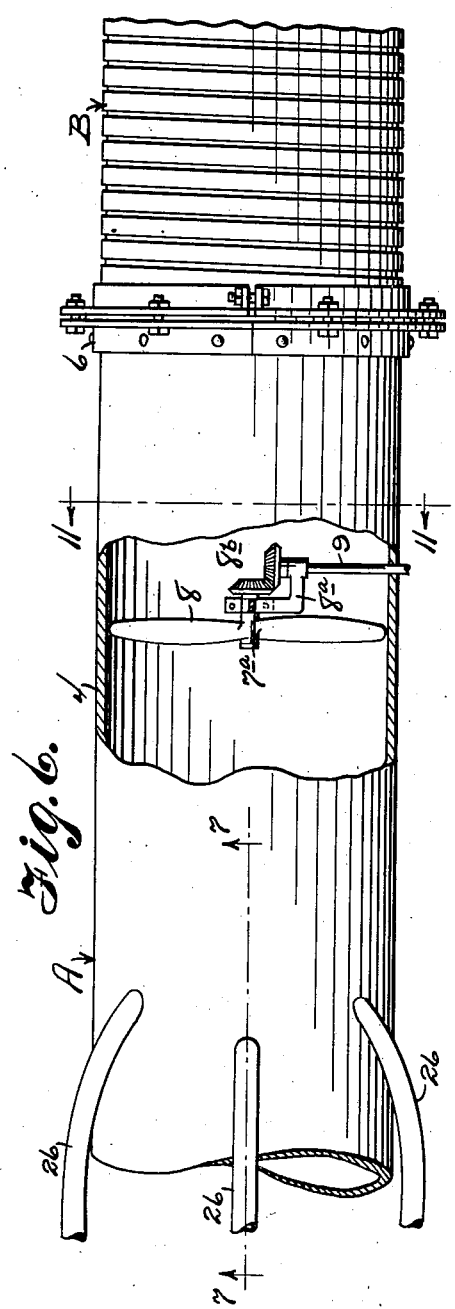
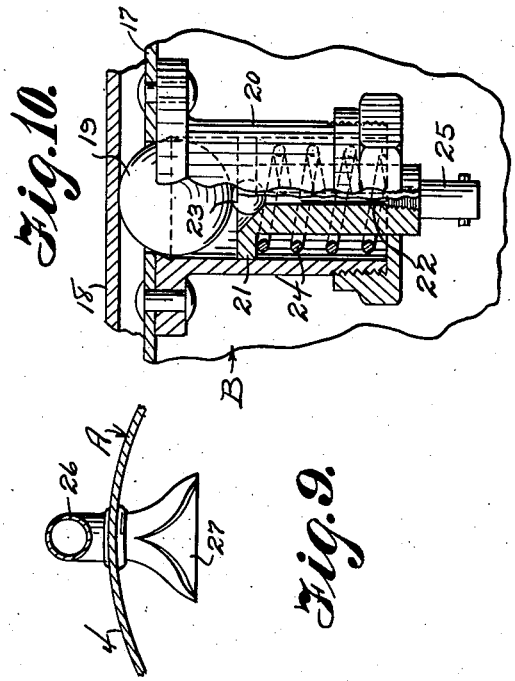
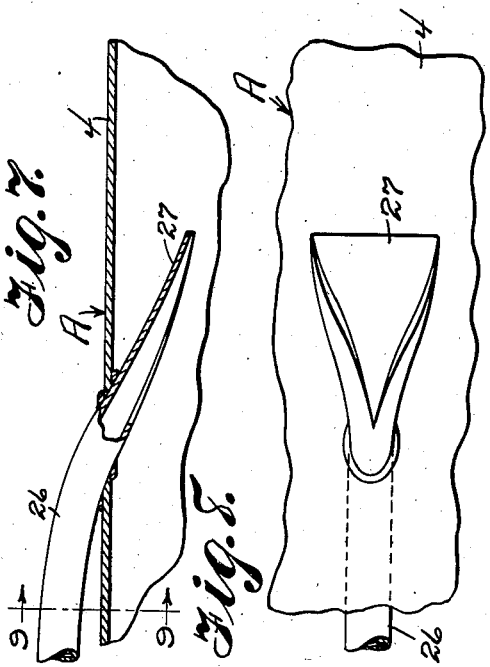

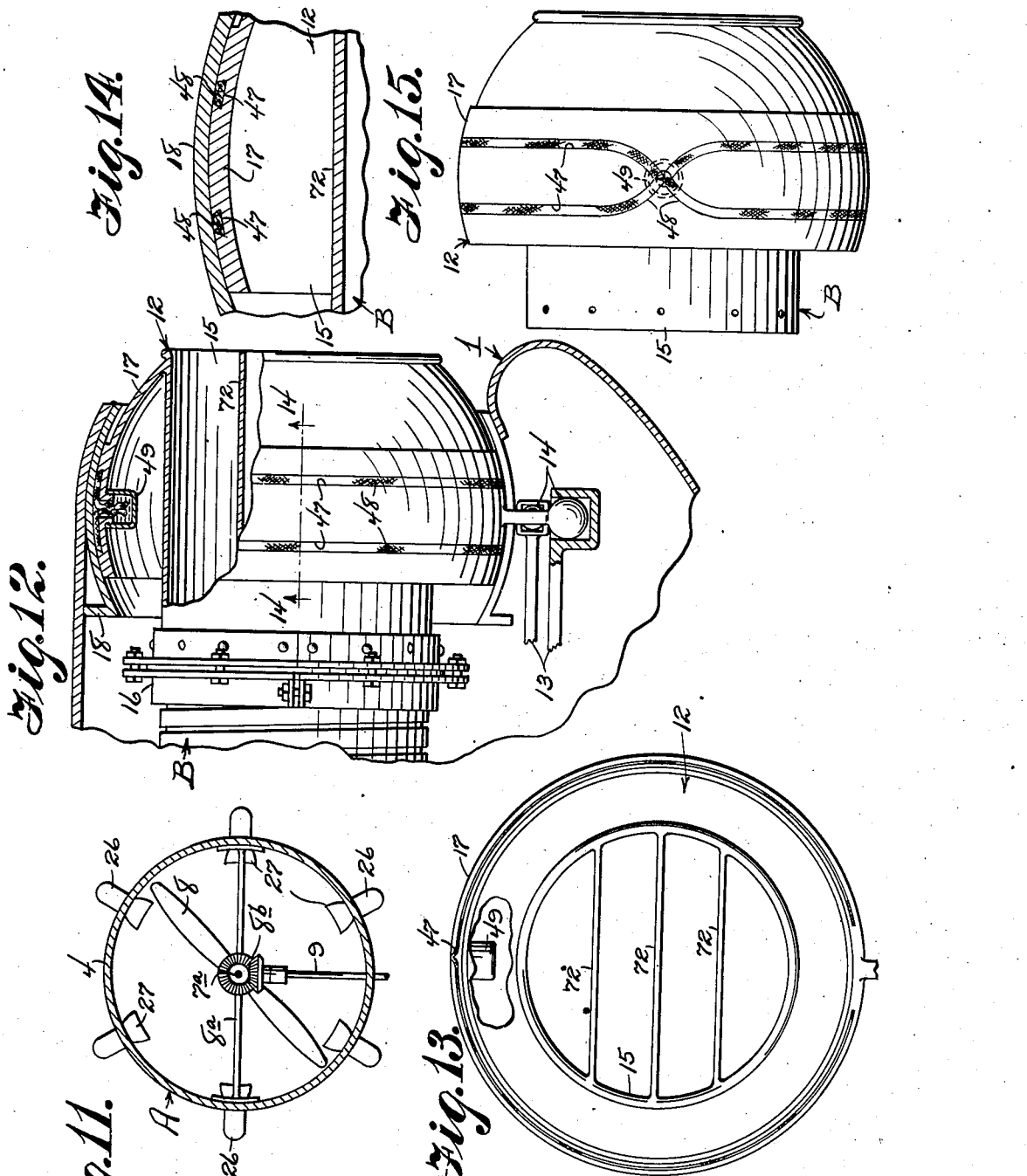

March 12, 1940.    A. G. PAPRITZ    2,193,375
AIRPLANE
Filed Oct. 31, 1938    8 Sheets-Sheet 5
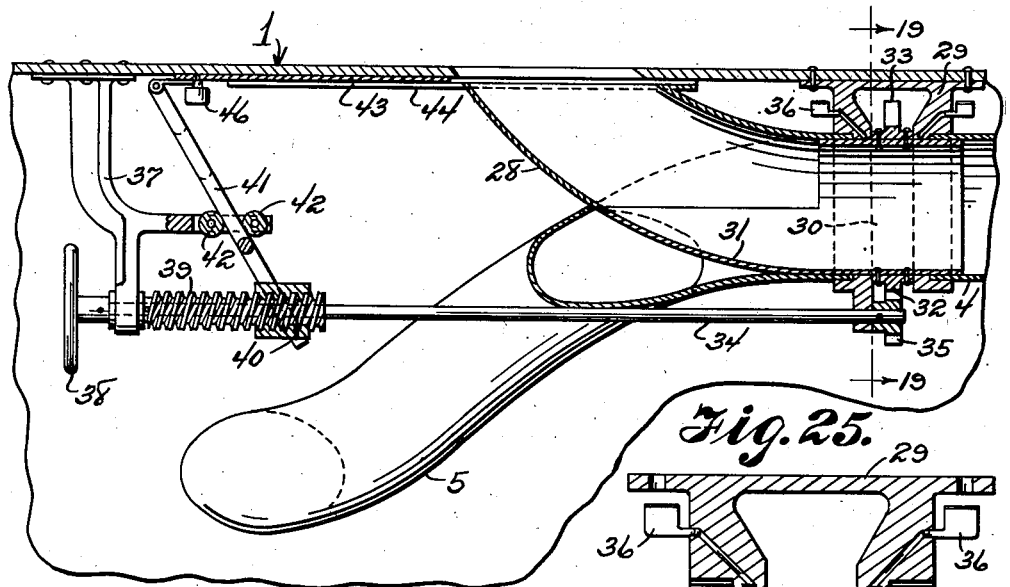
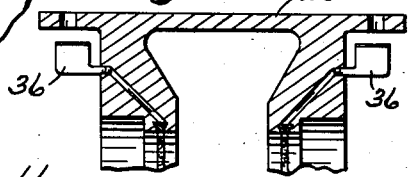
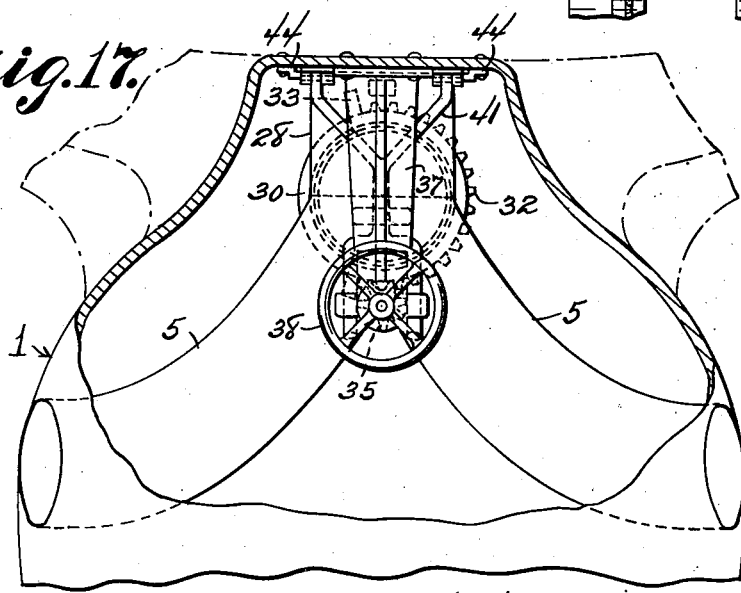
Adolph Papritz INVENTOR
BY Victor J. Evans & Co.
ATTORNEYS March 12, 1940.　　　A. G. PAPRITZ　　　2,193,375
AIRPLANE
Filed Oct. 31, 1938　　　8 Sheets-Sheet 6
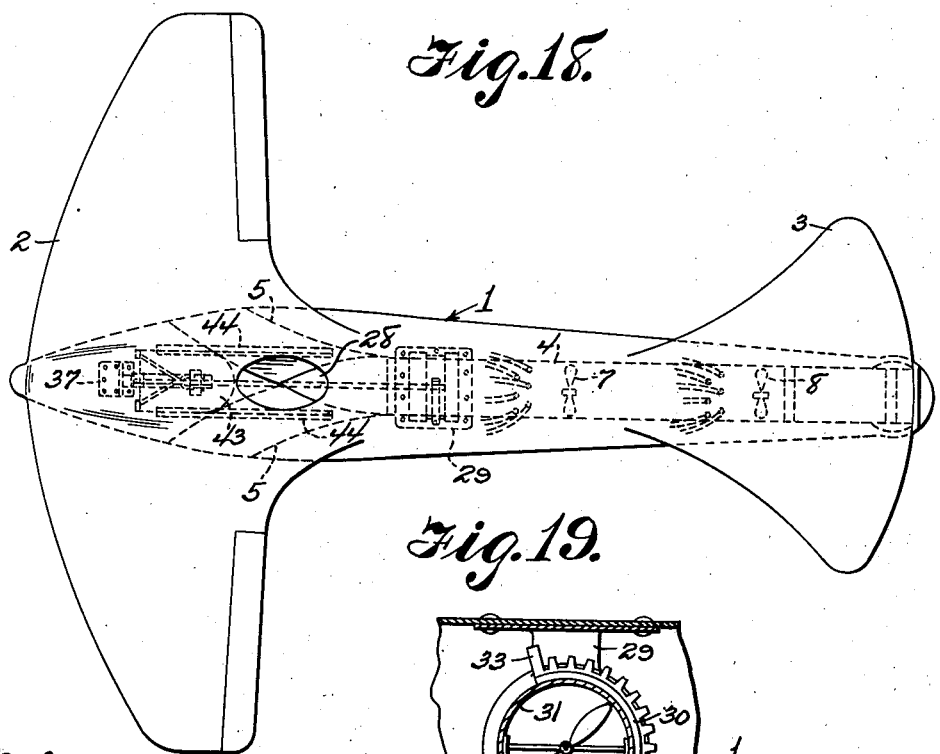
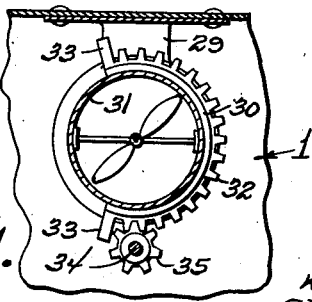
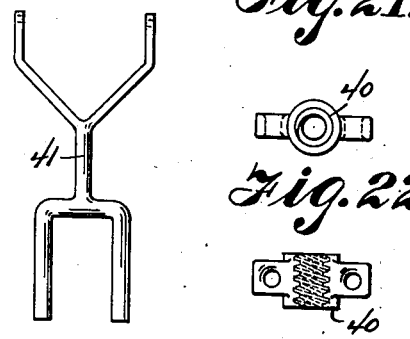
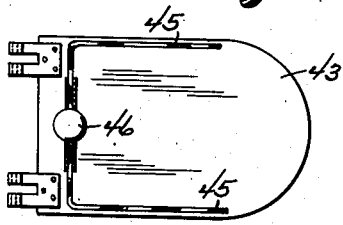
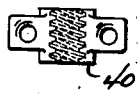
Adolph Papritz
INVENTOR
BY Victor J. Evans & Co.
ATTORNEYS March 12, 1940.  A. G. PAPRITZ  2,193,375
AIRPLANE
Filed Oct. 31, 1938   8 Sheets-Sheet 7
Fig. 26.
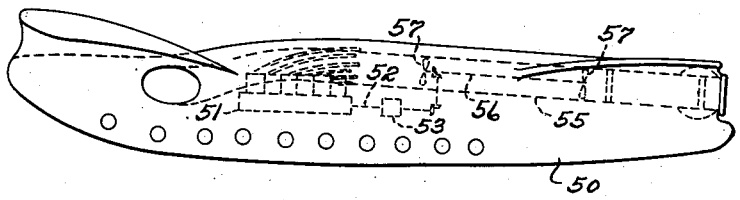
Fig. 27.
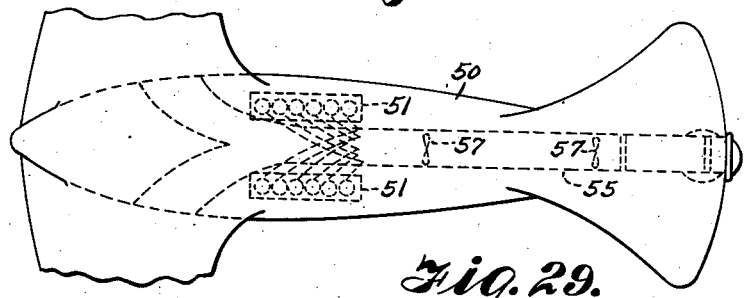
Fig. 28.
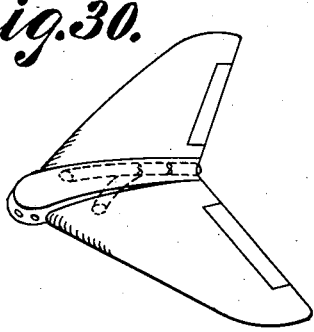
Fig. 29.
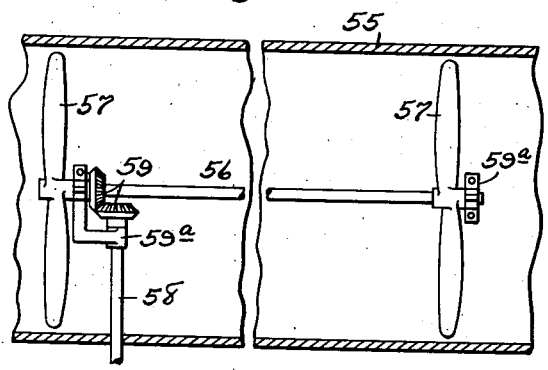
Fig. 30.
Fig. 31.
Adolph Papritz
INVENTOR
BY Victor J. Evans & Co.
ATTORNEYS

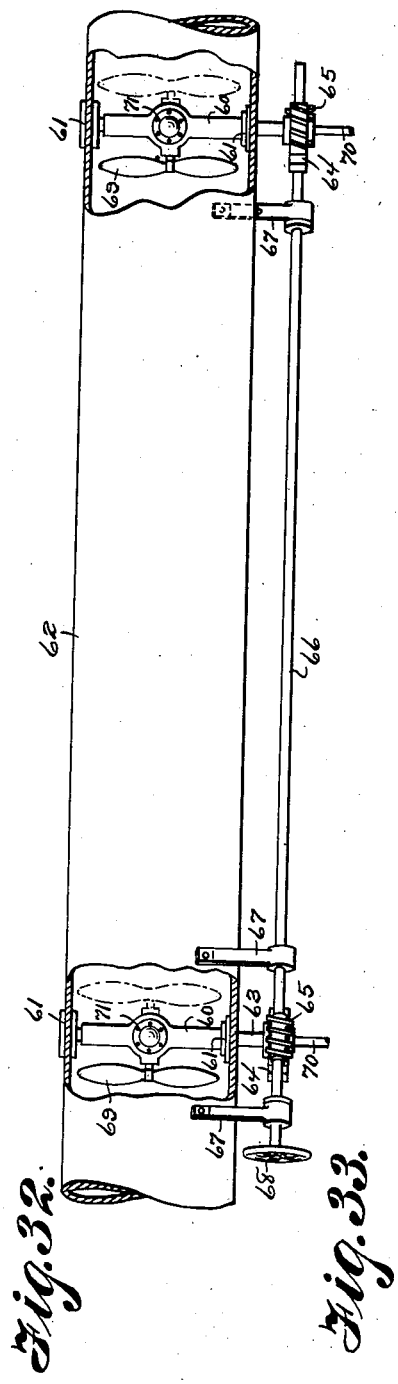
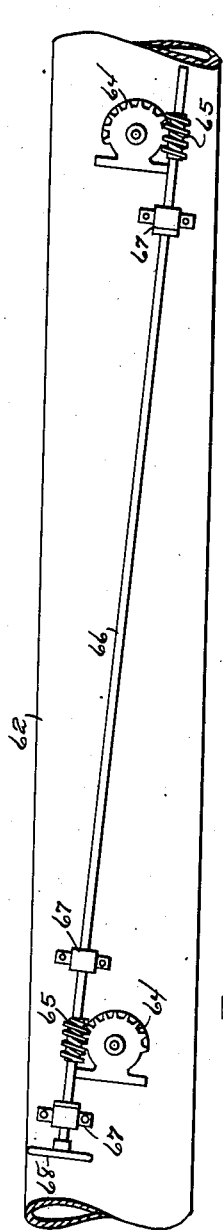
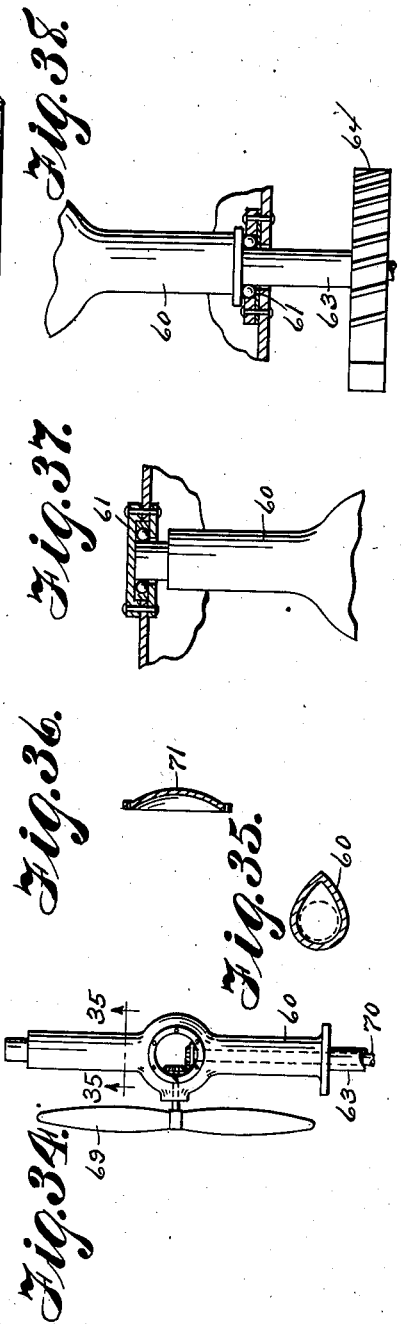

Patented Mar. 12, 1940

2,193,375

UNITED STATES PATENT OFFICE 2,193,375

AIRPLANE

Adolph G. Papritz, Chicago, Ill.

Application October 31, 1938, Serial No. 238,097

23 Claims. (Cl. 244—4)

My invention relates to aeronautics and has as one of the principal objects thereof the provision of an airplane of a novel construction wherein the propellers are so arranged that the air sustaining the airplane in flight will not be disturbed by said propellers before contacting the wings of said airplane.

Another object of my invention is the arranging of the propellers within an air duct which extends substantially longitudinally of the body of the airplane, taking air in at the forward end and exhausting air at the rear end thereof, the propellers acting in tandem on the air taken in the duct and expels said air with force against the outside air to create a thrust to drive the airplane in a forward direction, the propellers being thus located are permitted to act to their fullest extent on the air of the duct and not hinder by the engine or other parts heretofore acting to decrease the efficiency of the propellers.

An important object of my invention is the provision of means for directing the exhaust of the engine into the air duct for warming the air traveling therethrough, thus preventing ice formations on the propellers and parts of the air duct and also acting to increase the flow of air into the air duct and to said propellers.

A further object of my invention is the provision of means at the exhaust end of the air duct for varying the direction of flow of air leaving said duct for steering the airplane.

A still further object of my invention is to provide an airplane of the character described equipped with air intakes for the air duct, whereby air may be taken in from under the wings and rearwardly thereof, from the top of the airplane body between the wings and includes means whereby the intake of air to the duct may be from under said wings or from the top of the airplane body in accordance with the desires of the pilot to meet different flying conditions.

A special object of my invention is to provide an airplane of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views;

Figure 1 is a top plan view of my invention.
Figure 2 is a side elevation thereof.
Figure 3 is a front elevation of the same.

Figure 6 is a fragmentary side elevation, partly in section, illustrating a portion of the air duct in which is mounted one of the propellers.

Figure 7 is a detail sectional view taken on the line 7—7 of Figure 6.

Figure 8 is a fragmentary plan view illustrating the exhaust end of the exhaust pipe which serves as a deflector.

Figure 9 is a detail sectional view taken on the line 9—9 of Figure 7.

Figure 10 is a fragmentary vertical sectional view showing one of the anti-friction bearings for the support of the exhaust nozzle of the air conduit.

Figure 11 is a transverse sectional view taken on the line 11—11 of Figure 6.

Figure 12 is a fragmentary vertical sectional view illustrating a modified form of the means for mounting the exhaust nozzle of the air duct.

Figure 13 is an end elevation illustrating the exhaust nozzle with the type of mounting disclosed in Figure 12.

Figure 14 is a detail sectional view taken on the line 14—14 of Figure 12.

Figure 15 is a top plan view illustrating the modified form of exhaust nozzle and the lubricating means therefor.

Figure 16 is a fragmentary vertical sectional view showing a modified form of the air inlets for the air duct and the control for said inlets.

Figure 17 is a fragmentary transverse sectional view showing the means of operating the control.

Figure 18 is a top plan view illustrating the complete airplane with a modified form of air inlets for the air duct.

Figure 19 is a transverse sectional view taken on the line 19—19 of Figure 16.

Figure 20 is a front elevation showing a connecting forked lever used in the construction of the operating means for the gate of one of the air inlets.

Figure 21 is an end elevation illustrating the feed nut.

Figure 22 is a top plan view of said nut.

Figure 23 is a top plan view illustrating a supporting bracket employed in the construction of the operating means for the control of the air duct.

Figure 24 is a plan view illustrating the gate and the lubricating means therefor.

Figure 25 is a fragmentary vertical sectional view illustrating a portion of the hanger for supporting one end of the air duct, the air inlets, and the air control for said air inlets, together with the wick equipped lubricant reservoirs.

Figure 26 is a side elevation of my invention illustrating a modified form of motor arrangement.

Figure 27 is a top plan view of the construction illustrated in Figure 26.

Figure 28 is a front elevation of the construction illustrated in Figure 27.

Figure 29 is a fragmentary longitudinal sectional view of the air duct illustrating the modified form of propeller mounting utilized in the form of invention disclosed in Figures 26 to 28.

Figure 30 is a perspective view of another modified form of my airplane.

Figure 31 is a front elevation of my airplane as illustrated in Figure 30, the airplane being shown in flight.

Figure 32 is a side elevation illustrating the mechanism for reversing the propellers.

Figure 33 is a bottom plan view of the mechanism illustrated in Figure 32.

Figure 34 is a detail side elevation of a modified form of reversible propeller housing.

Figure 35 is a detail sectional view taken on the line 35—35 of Figure 34.

Figure 36 is a detail transverse sectional view of the cover plate for the modified form of reversible propeller housing.

Figure 37 is a detail sectional view illustrating the upper end of the modified form of reversible propeller housing and the mounting therefor.

Figure 38 is a detail sectional view of the lower end of the modified form of reversible propeller housing illustrating the mounting and drive therefor.

Figure 4:
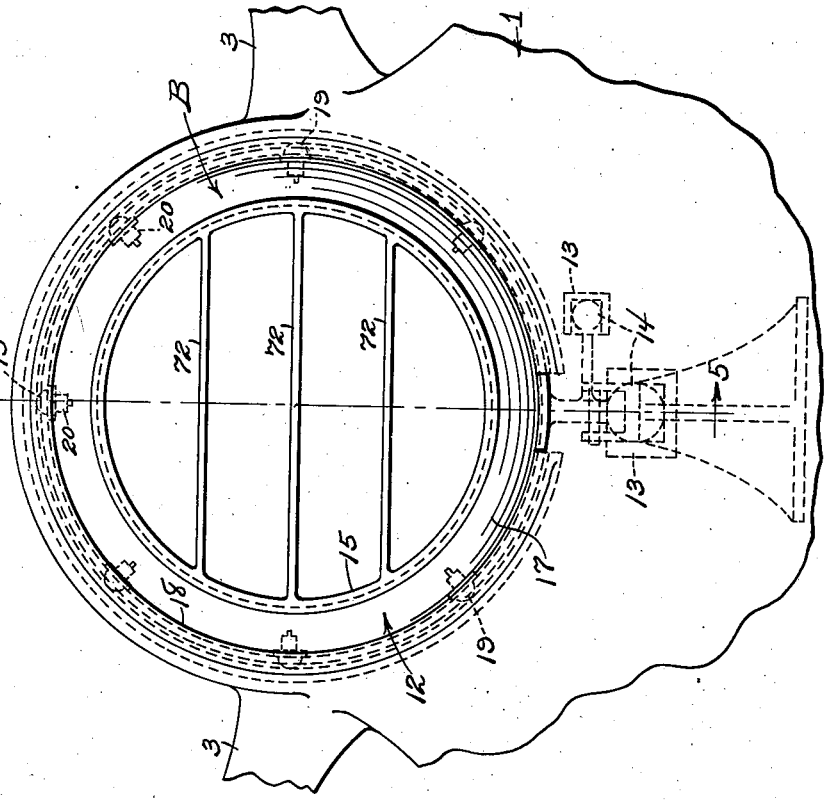
Figure 4 is a fragmentary rear elevation illustrating the nozzle.
Figure 5:
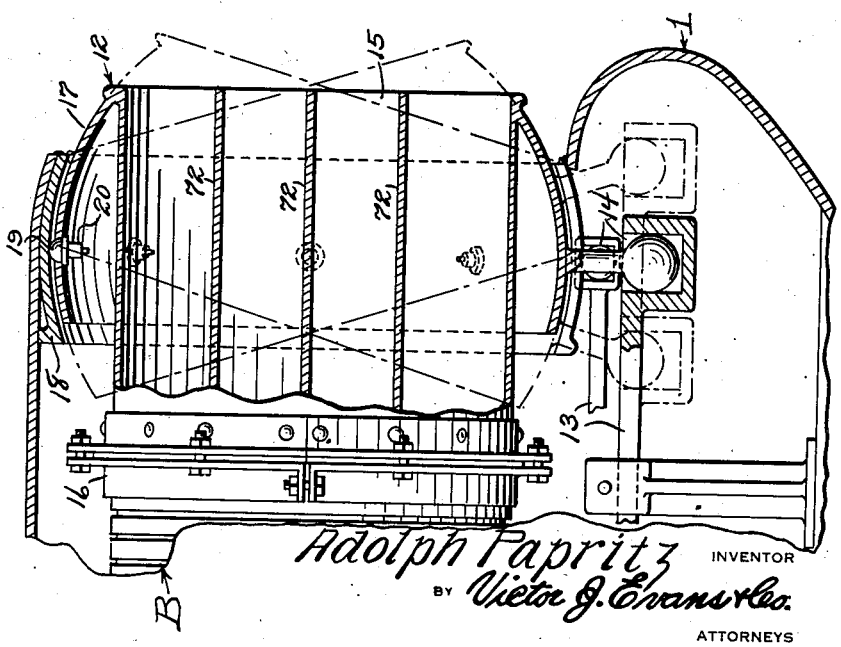
Figure 5 is a detail sectional view taken on the line 5—5 of Figure 4.

In practicing my invention, in the preferred embodiment illustrated in the drawings, I provide an airplane fashioned with a fuselage 1 and forward and tail wings 2 and 3 respectively. Said fuselage is of a streamline design and the forward wings 2, as to their shapes, are best shown in Figures 1 to 3 inclusive of the drawings. Also, the general design or shape of the rear or tail wings 3 are clearly illustrated in said figures and it is to be noted that the tail wings 3 are in a plane slightly above the plane of the forward wings 2, the body having a curvature for the positioning of the tail wings as before stated relative to the forward wings.

Mounted in the fuselage 1 and extending longitudinally therethrough is a main air duct 4, the rear end of which being the exhaust end is located in close proximity to the tail end of the body and in a plane above the forward or front wings thereof. The forward end of the duct 4 terminates short of the rear edges of the forward or front wings and has connected thereto inlet ducts 5 diverging from each other and opening outwardly to the sides of the body under the forward wings and rearwardly adjacent the rear edges of said forward wings. The inlet ducts 5 opening outwardly to the atmosphere under the forward wings as described assures the main air duct receiving a full capacity of air therein.

The air duct 4 consists of sections A and B and said section B is of a flexible tube construction and is located rearwardly of the section A. The section A as well as the inlet ducts 5 are of a rigid construction. A sectional clamp 6 is employed for detachably connecting the sections A and B together.

Front and rear propellers 7 and 8, respectively, are mounted for operation in the section A and act to draw air through the air ducts with a pulling effect for the propulsion of the airplane. The propellers are arranged in tandem manner in the air duct as shown in Figures 1 and 2 and are provided with propeller shafts 7a rotatably journaled in bearing brackets 8a fixed within said duct. The propeller shafts 7a are connected by means of gearing 8b with right angularly disposed drive shafts 9 extending without said duct, the latter being driven by engines 10 mounted in the fuselage. The propellers may be driven in either direction by the engines by means hereinafter set forth.

The air in the air duct acted on by the propellers will be exhausted from the rear end of the air duct under considerable force and the air impinging against the outside air creates a thrust acting for the propulsion of the airplane in a forward direction. The direction of flow of the exhaust air from the air duct or section B thereof may be varied through the use of an adjustable exhaust nozzle 12 capable of a universal movement. The nozzle 12 has connected thereto controls 13, one of said controls moving the nozzle to direct the exhaust air in either an upward or downward direction while the other control 13 is employed for moving the nozzle 12 sideways in an opposite direction to direct the exhaust air in sideways direction.

Through the use of the nozzle 12 for varying the path of the exhausting air against the outside air permits guiding of the airplane upwardly or downwardly or sideways.

Ball and socket joints 14 are employed for connecting the nozzle 12 to the controls 13. The nozzle 12 includes a sleeve 15 through which the exhaust air passes and is detachably connected to the flexible tube section B of the air duct by a sectional clamp 16 and has integral therewith a substantially spherical shaped bearing portion 17 fitting within a like shaped bearing portion 18 mounted in the fuselage 1.

Interposed between the bearing portions 17 and 18 is a series of anti-friction balls 19, the mounting for said balls being shown at 20 and is carried by the portion 17 and includes cylinders shaped to form seats for the balls and receives therein spring pressed plungers 21 provided with lubricating bores 22. Ball type check valves 23 operate in the bores 22 and contact the balls 19 under the influence of the springs 24 of the plungers 21. Lubricating fittings 25 are connected with the bores 22 whereby lubricant may be forced into the cylinders 20 through the use of an ordinary lubricating gun. As the lubricant builds up in the cylinders the plungers are moved against the action of the springs 24 so that the lubricant is kept under pressure in the cylinders by the plungers and thereby effecting lubrication of the balls 19 at all times.

The engines within the fuselage are equipped with exhaust pipes 26 and the exhaust pipes of the forward engine enter the air duct forwardly of the thrust propeller while the exhaust pipes of the rear engine enter the air duct forwardly of the rear propeller. The discharge ends of the exhaust pipes are in the form of blades 27 extending at a selected angle within the air duct for the purpose of deflecting a reverse flow of air in the air duct away from the exhaust pipe but still permitting a free flow of engine exhaust from the exhaust pipes into the air duct.

The exhaust from the engines entering the air duct from the exhaust pipes has a tendency to drive air through the duct in the direction of the propellers 7 and 8 and creates suction in the forward portion of said air duct. The exhaust from the engines entering the air duct warms the air therein to preclude the formation of ice on the propellers and exhaust nozzle.

When landing the airplane it is desirable that the propellers be operated in a reverse direction, the air being taken in the air duct at the exhaust nozzle and discharged underneath the wings, the blades 27 at this time acting to prevent the reverse flow of air from choking down the escaping exhaust gases from the exhaust pipes. The air thus discharged under the wings by the propellers operating in a reverse direction permits landing of the airplane at a slower rate of speed and within a more limited area.

The air escaping from the outlets 5 at the time of the landing of the airplane has a lifting effect on the wings, consequently permitting a more gradual descent of the airplane. The propellers operating in the air duct 4 permit the propellers to have a maximum pulling effect on the air due to the fact that the propellers are unobstructed from their hubs to the tips of the blades. Also, the propellers operating in the air duct do not disturb the air outside of the airplane prior to reaching the forward wings as in airplanes of a conventional construction. The propellers operating in the air duct in the foregoing described manner may be driven by means of smaller horse-power engines than heretofore obtainable due to the fact that the propellers operate at their maximum efficiency on the air, consequently rendering a large saving in fuel and permitting a much greater cruising radius for the airplane. Also, the air being drawn to the air duct by the propellers aids the wings in sustaining the airplane in flight and for aiding the propellers in the flow of air through the air duct the exhaust of the engines is employed which further heats the air to prevent formation of ice on the propellers as well as the exhaust nozzle used for steering purposes.

As illustrated in Figures 12 to 15 of the drawings instead of employing the anti-friction balls in the mounting of the exhaust nozzle, the bearing portions 17 and 18 thereof may be in direct contact with each other and when this form of mounting is employed for the exhaust nozzle, the bearing portion 17 is equipped with grooves 47 to receive lubricating wicks 48 connected with a lubricant reservoir 49 so that the contacting faces of the bearing portions 17 and 18 will be thoroughly lubricated.

The grooves 47 and wicks 48 extend circumferentially of the bearing portion 17 as illustrated in Figure 15.

As illustrated in Figures 16 and 25 of the drawings an additional air inlet duct 28 may be employed in conjunction with the air inlet ducts 5. The air inlet duct 28 opens outwardly through the top of the fuselage 1 adjacent the rear edges of the forward wings. In this form of construction the air inlet duct 28 and air inlet ducts 5 are of integral formation and connect with each other, being supported at their connected ends by a hanger 29 mounted in the fuselage 1. The hanger 29 also supports the forward end of the main air duct 4 and the latter is connected to the air inlet ducts 5 and 28 by a rotatable sleeve 30 carrying a control plate 31 which, when into one position, opens the air inlet duct 28 to the air duct 4 and closes the air inlet ducts 5 to the air duct 4 and when moved into another position opens the air ducts 5 to the air duct 4 and closes the air duct 28 to the air duct 4.

A segmental gear 32 is secured on the sleeve 30 and includes stops 33 at each end of the teeth thereof. An operating shaft 34 is connected to the segmental gear by a pinion 35 whereby the sleeve may be rotated in opposite directions for a limited distance for alternately opening and closing the air ducts 28 and 5 to the air duct 4.

A lubricating means 36 is carried by the hanger 29 for furnishing lubrication to the sleeve 30. The shaft 34 is supported by the hanger 29 and also by a bracket 37 mounted on the fuselage 1 and is equipped with a hand wheel 38. A feed worm 39 is mounted on the shaft 34 engaged by a feed nut 40 and the latter is connected to a forked lever 41 pivotally and slidably mounted on the bracket 37 by rollers 42. The forked lever 41 is pivotally connected to a slidable gate 43 which may be positioned to open and close the air inlet duct 28 and is slidably mounted in guides 44 on the fuselage.

When the sleeve 30 is positioned to close the duct 28 to the duct 4 the gate 43 is also positioned to close the intake end of the duct 28. Mounted in grooves in the gate 43 are lubricating wicks 45 connected with a lubricant reservoir 46 carried by the gate so that lubricant by capillary attraction will be fed to the guides 44 of the gate, permitting the gate to slide with a minimum amount of friction. It is to be understood that when the air inlet duct 28 is connected to the air duct 4 and the inlet ducts 5 are closed to the air duct 4 the gate 43 is positioned to open the inlet end of the air duct 28. The operation of the gate 43 is simultaneous with the operation of the control plate 31 carried by the sleeve 30. To permit the taking off of the airplane within a comparatively limited area, the air duct 28 is employed, that is, it is open to the atmosphere while the air ducts 5 are closed to the air duct 4. The air being taken into the air duct 28 from the top side of the fuselage permits the airplane to rise more rapidly and easier within a limited space. The connection between the air duct 4 and the air inlet ducts 5 will permit an unobstructed flow of air into the duct 4 regardless of what air inlet ducts are being employed.

As illustrated in Figures 26 to 31 inclusive of the drawings the fuselage 50 has mounted therein adjacent the rear edges of the forward wings a pair of engines arranged laterally relative to each other, said engines being indicated generally by the numeral 51 and provided with drive shafts 52 connected to reverse gearing mechanism 53. When the engines are thus arranged, the air duct 55 has mounted therein a longitudinally extending propeller shaft 56 and on each end of which is mounted a propeller 57. Said propeller shaft 56 is driven by a shaft 58 extending without said air duct and connected to the reverse gearing mechanism 53 through the medium of gears 59. The air duct has mounted therein brackets 59a in which are journaled the shafts 56 and 58 whereby the latter are supported.

Referring to the preferred embodiment of my invention, the motors 10 are each connected to the shafts 9 and interposed between said shafts 9 are reverse gearing mechanism 11 whereby the propellers 7 and 8 may be reversed as heretofore set forth. However, as illustrated in Figures 32 to 38 inclusive, the propellers may be mounted on reversible housings 60, the ends of which are journaled in bearings 61 in the air duct 62 and the lower ends of each of said housings are provided with a hollow shaft section 63 extending without the air duct and have fixed thereon gears 64 meshing with gears 65 mounted on a shaft 66 supported exteriorly of said air duct by means of bearing brackets 67 and said shaft 66 is equipped at the forward end thereof with a hand wheel 68 whereby the housings 60 may be rotated within the air duct to position the propellers 69 mounted thereon in a reverse direction as clearly illustrated in Figure 32. The propellers 69 are connected to a shaft 70 which extends through the housings 60 and is connected to the engines for driving said propellers. The housings 60 are of streamline configuration in cross section and each of said housings are provided with apertures covered by plates 71 whereby access may be had to the gearing therein as clearly illustrated in Figure 34.

The sleeve 15 of the exhaust nozzle, both in the preferred and modified forms and through which the escaping air passes is divided by horizontally arranged spaced plates 72, the purpose of which is to break up the swirl in the air passing through the sleeve 15 from the propellers so that the air when leaving the exhaust nozzle will be directed rearward in parallel streams, which impinging against the outside air creates a better thrust in a forward direction for aiding in propulsion of the airplane in said direction as well as giving better control in the steering of the airplane by the exhausting air.

The airplane is capable of being maintained in a stationary or hovering position above the ground upon reversing the propellers and operation of the latter at maximum speed. When the propellers are thus operated, a maximum amount of air will be drawn into the sleeve 15 at the exhaust nozzle end thereof and strike or impinge against the horizontally disposed plates 72 and have a tendency to elevate the tail of said airplane. As the air flows through the main air duct 4 and is discharged under the forward wings, it causes the airplane to remain in an elevated and stationary position relative to the ground. In order to preclude rearward flight of the airplane when the propellers are operated in the foregoing manner, the ailerons 2a, mounted on the forward wings 2, are operated to depending positions to serve as brakes for preventing said rearward flight.

An airplane constructed in accordance with the foregoing description and as shown in the drawings will have a much greater cruising radius due to the lower consumption of fuel and also will permit the airplane to take off and land in smaller areas and at a much reduced rate of speed. The exhaust of the engines emptying into the air duct as heretofore described and creating the advantages previously set forth also acts as a muffler for the exhaust, permitting quieter operation of the airplane. An airplane of the character set forth will be easier in operation due to less disturbance of outside air before said air reaches the sustaining wings of the airplane due to the location of the propellers and engines as heretofore described.

Also, the cabins of fuselages of airplanes constructed in the foregoing described manner will eliminate the necessity of soundproofing said cabins and also the tires, due to the relatively low landing speed, will last over longer periods of time, in fact, until they are worn threadbare.

Lower fuel consumption, longer wear of the tires and elimination of soundproofing of the cabins are a few of the desirable results obtained and which materially reduces both operating and construction costs of my novel forms of airplanes.

What I claim is:

1. An airplane comprising a body, wings on said body, a main air duct arranged in and extending longitudinally of said body, air inlet ducts connected to said main duct and opening outwardly through walls of the body to take in air from the outside of said body, means adjacent the rear of the main duct to vary the direction of flow of air from said main duct against said outside air for steering and aiding in the propulsion of said body, propellers operating in the main air duct, an engine connected to said propellers for operating the latter and equipped with exhaust pipes having flared ends arranged in said main air duct and disposed at an angle to the flow of air through said duct and providing baffles to a reverse flow of air through the main air duct during the operation of the propellers in a reverse direction.

2. An airplane comprising a body, front and rear wings on said body with the rear wings disposed in a plane above the front wings, a main air duct arranged in and extending longitudinally of said body, air inlet ducts connected to said main duct and opening outwardly through walls of the body to take in air from the outside of the body rearwardly and adjacent the rear edges of the front wings and in a plane below said front wings, means at the rear end of the main duct and located at the rear end of the body to vary the direction of flow of air from said main duct against the outside air for steering and aiding in the propulsion of the body, propellers operating in the main air duct, engines mounted in the body, drive means connecting the engines to said propellers and including means for driving said propellers in either direction, means for directing exhaust from said engines into the main air duct, and including exhaust pipes having flared discharge ends arranged in the main air duct and disposed at an angle to the flow of air through said duct and providing baffles to a reverse flow of air through the main air duct during the operation of the propellers in a reverse direction.

3. An airplane comprising a body, front and rear wings on said body with the rear wings disposed in a plane above the front wings, a main air duct arranged in and extending longitudinally of said body, air inlet ducts connected to said main duct and opening outwardly through walls of the body to take in air from the outside of the body rearwardly and adjacent the rear edges of the front wings and in a plane below said front wings, means at the rear end of the main duct and located at the rear end of the body to vary the direction of flow of air from said main duct against the outside air for steering and aiding in the propulsion of the body, propellers operating in the main air duct, engines mounted in the body and equipped with exhaust pipes having flared discharge ends arranged in the main air duct and disposed at an angle to the flow of air through said duct and providing baffles to a reverse flow of air through the main air duct during the operation of the propellers in a reverse direction, drive means connecting the engines to said propellers, and means for driving said propellers in either direction.

4. An airplane comprising a body, front and rear wings on said body, a main air duct arranged in and extending longitudinally of said body, means for admitting air to said duct, propellers operating in said duct, internal combustion engines for driving said propellers and including exhaust pipes connected with the duct and provided with flared discharge ends arranged in the main air duct and disposed at an angle to the flow of air through said main air duct and providing baffles to a reverse flow of air through the main air duct upon operation of said propellers in a reverse direction, an exhaust nozzle connected with and movable relative to the rear end of the duct for varying the direction of flow of air from said duct for steering and aiding in the propulsion of the body.

5. An airplane comprising a body, front and rear wings on said body, a main air duct arranged in and extending longitudinally of said body, means for admitting air to said duct, propellers operating in said duct, internal combustion engines for driving said propellers and including exhaust pipes connected with the duct and provided with flared discharge ends arranged in the main air duct and disposed at an angle to the flow of air through said main air duct and providing baffles to a reverse flow of air through the main air duct upon operation of said propellers in a reverse direction, an exhaust nozzle connected with and movable relative to the rear end of the duct for varying the direction of flow of air from said duct for steering and aiding in the propulsion of the body, said exhaust nozzle including a mounting to permit a universal movement of the exhaust nozzle.

6. An airplane comprising a body, front and rear wings on said body, a main air duct arranged in and extending longitudinally of said body, means for admitting air to said duct, propellers operating in said duct, internal combustion engines for driving said propellers and including exhaust pipes connected with the duct and provided with flared discharge ends arranged in the main air duct and disposed at an angle to the flow of air through said main air duct and providing baffles to a reverse flow of air through the main air duct upon operation of said propellers in a reverse direction, an exhaust nozzle connected with and movable relative to the rear end of the duct for varying the direction of flow of air from said duct for steering and aiding in the propulsion of the body, said exhaust nozzle including a mounting to permit a universal movement of the exhaust nozzle, and lubricating means for said mounting.

7. An airplane comprising a body, front and rear wings on said body, a main air duct arranged in and extending longitudinally of said body, means for admitting air to said duct, propellers operating in said duct, internal combustion engines for driving said propellers and including exhaust pipes connected with the duct and provided with flared discharge ends arranged in the main air duct and disposed at an angle to the flow of air through said main air duct and providing baffles to a reverse flow of air through the main air duct upon operation of said propellers in a reverse direction, an exhaust nozzle connected with and movable relative to the rear end of the duct for varying the direction of flow of air from said duct for steering and aiding in the propulsion of the body, said exhaust nozzle including a mounting to permit a universal movement of the exhaust nozzle, and lubricating means for said mounting and including anti-friction balls to reduce friction in the movement of said nozzle.

8. An airplane comprising a body, front and rear wings on said body, a main air duct arranged in and extending longitudinally of said body, an exhaust nozzle connected to and movable relative to the air duct and located rearwardly of the rear wings, propellers operating in said air duct, an internal combustion engine for driving said propellers and provided with exhaust pipes having ends extending within said main air duct and disposed at an angle therein relative to the axis of said main air duct and providing baffles to a reverse flow of air through the main air duct upon operation of the propellers in a reverse direction, and inlet ducts connected to the main duct and opening outwardly through opposite sides of the body under the front wings and rearwardly adjacent the rear edges of the latter.

9. An airplane comprising a body, front and rear wings on said body, a main air duct arranged in and extending longitudinally of said body, an exhaust nozzle connected to and movable relative to the air duct and located rearwardly of the rear wings, propellers operating in said air duct, an internal combustion engine for driving said propellers and provided with exhaust pipes having ends extending within said main air duct and disposed at an angle therein relative to the axis of said main air duct and providing baffles to a reverse flow of air through the main air duct upon operation of the propellers in a reverse direction, inlet ducts connected to the main duct and opening outwardly through opposite sides of the body under the front wings and rearwardly adjacent the rear edges of the latter, an air inlet duct connected to said first named air inlet ducts and opening outwardly through a top wall of the body, and a control for opening and closing alternatingly the first and second named air inlet ducts to the main air duct.

10. An airplane comprising a body, front and rear wings on said body, a main air duct arranged in and extending longitudinally of said body, an exhaust nozzle connected to and movable relative to the air duct and located rearwardly of the rear wings, propellers operating in said air duct, an internal combustion engine for driving said propellers and provided with exhaust pipes having ends extending within said main air duct and disposed at an angle therein relative to the axis of said main air duct and providing baffles to a reverse flow of air through the main air duct upon operation of the propellers in a reverse direction, inlet ducts connected to the main duct and opening outwardly through opposite sides of the body under the front wings and rearwardly adjacent the rear edges of the latter, an air inlet duct connected to said first named air inlet ducts and opening outwardly through a top wall of the body and between the rear edges of said front wings, a control for opening and closing alternatingly the first and second named air inlet ducts to the main air duct, and operating means for said control and including a slidable gate for the opening and closing of the second named air inlet duct.

11. An airplane comprising a body, wings on said body, a main air duct arranged in and extending longitudinally of said body and including a flexible section, propellers operating in said duct, an internal combustion engine for operating said propellers and equipped with exhaust pipes having flared discharge ends arranged in the main duct and disposed at an angle to the flow of air through said duct and providing baffles to a reverse flow of air through said duct during operation of the propellers in a reverse direction, means for admitting air to said duct, an exhaust nozzle mounted for universal movement relative to said body and connected to the flexible section of the air duct, and a control connected to said nozzle.

12. An airplane comprising a fuselage, wings mounted on said fuselage, an air duct within said fuselage and extending longitudinally thereof, propellers in said duct, an internal combustion engine for operating said propellers and equipped with exhaust connections extending within said air duct and disposed at an angle relative to the axis thereof and providing baffles to a reverse flow of air through said air duct means for admitting air to said duct, and an exhaust nozzle mounted for universal movement relative to said fuselage and connected to said air duct whereby to direct air from said air duct for propelling said airplane.

13. An airplane comprising a fuselage, wings mounted on said fuselage, an air duct within said fuselage and extending longitudinally thereof, propellers in said duct, an internal combustion engine for operating said propellers and equipped with exhaust connections extending within said air duct and disposed at an angle relative to the axis thereof and providing baffles to a reverse flow of air through said air duct, means for admitting air to said duct, an exhaust nozzle mounted for universal movement relative to said fuselage and connected to said air duct whereby to direct air from said air duct for propelling said airplane, and a reversing mechanism connected to said propellers for reversing the latter whereby said airplane may be maintained in an elevated and relatively stationary position above the ground.

14. The elements of claim 1 as set forth and defined including, and means connected to said propellers for effecting operation of the latter in either direction.

15. The elements of claim 4 as set forth and defined including, and means connected to said propellers for effecting operation of the latter in either direction.

16. The elements of claim 5 as set forth and defined including, and means connected to said propellers for effecting operation of the latter in either direction.

17. The elements of claim 6 as set forth and fined including, and means connected to said propellers for effecting operation of the latter in either direction.

18. The elements of claim 7 as set forth and defined including, and means connected to said propellers for effecting operation of the latter in either direction.

19. The elements of claim 8 as set forth and defined including, and means connected to said propellers for effecting operation of the latter in either direction.

20. The elements of claim 9 as set forth and defined including, and means connected to said propellers for effecting operation of the latter in either direction.

21. The elements of claim 10 as set forth and defined including, and means connected to said propellers for effecting operation of the latter in either direction.

22. The elements of claim 11 as set forth and defined including, and means connected to said propellers for effecting operation of the latter in either direction.

23. The elements of claim 12 as set forth and defined including, and means connected to said propellers for effecting operation of the latter in either direction.

ADOLPH G. PAPRITZ.